(12) United States Patent
Li

(10) Patent No.: US 12,541,700 B2
(45) Date of Patent: Feb. 3, 2026

(54) LOW-POWER WAVEFORM CONTROLLERS FOR SUPERCONDUCTING AND SPIN QUANTUM BITS

(71) Applicant: Lismikro Inc., East Setauket, NY (US)

(72) Inventor: Shaorui Li, East Setauket, NY (US)

(73) Assignee: Lismikro Inc., East Setauket, NY (US)

( * ) Notice: Subject to any disclaimer, the term of this patent is extended or adjusted under 35 U.S.C. 154(b) by 0 days.

(21) Appl. No.: 18/834,167

(22) PCT Filed: Dec. 27, 2023

(86) PCT No.: PCT/US2023/086068
§ 371 (c)(1),
(2) Date: Jul. 29, 2024

(87) PCT Pub. No.: WO2024/145380
PCT Pub. Date: Jul. 4, 2024

(65) Prior Publication Data
US 2025/0318444 A1   Oct. 9, 2025

Related U.S. Application Data

(60) Provisional application No. 63/478,101, filed on Dec. 30, 2022.

(51) Int. Cl.
*H10N 60/80* (2023.01)
*H10N 60/12* (2023.01)

(52) U.S. Cl.
CPC .............. *H10N 60/80* (2023.02); *H10N 60/12* (2023.02)

(58) Field of Classification Search
CPC ............................. H10N 60/80; H10N 60/12
See application file for complete search history.

(56) References Cited

U.S. PATENT DOCUMENTS

| | | |
|---|---|---|
| 2009/0302958 A1 | 12/2009 | Sakurai et al. |
| 2021/0257969 A1* | 8/2021 | Bardin .................... G06F 1/20 |

OTHER PUBLICATIONS

Sundqvist, K et al. Negative-Resistance Models for Parametrically Flux-Pumped Superconducting Quantum Interference Devices. The European Physical Journal: Quantum Technology, Mar. 7, 2014, vol. 1, Article 6, pp. 1-21 [retrieved online Mar. 13, 2024]. Retrieved from [DOI: https://doi.org/10.1140/epjqt6].

United States Patent and Trademark Office; International Search Report and Written Opinion of International Searching Authority for Application No. PCT/US2023/086068, mailed Apr. 10, 2024 (10 pages).

* cited by examiner

*Primary Examiner* — Shih Tsun A Chou
(74) *Attorney, Agent, or Firm* — Nixon Peabody LLP

(57) ABSTRACT

According to one implementation, a quantum computing device, includes a plurality of quantum bits, and waveform generators. Each waveform generator is coupled to a respective one of the quantum bits. Each of the waveform generators further include: a current-pulse generator, an adjustable negative resistor, an adjustable capacitor, and a transformer. Moreover, each waveform generator is configured to program the respective quantum bit that is coupled thereto, using less than a few milliwatts of power. Other implementations of systems, methods, and computer program products are also disclosed.

17 Claims, 6 Drawing Sheets

LOW-POWER WAVEFORM CONTROLLERS FOR SUPERCONDUCTING AND SPIN QUANTUM BITS

CROSS-REFERENCE TO RELATED APPLICATIONS

This application is a U.S. National Stage of International Application No. PCT/US2023/086068, filed Dec. 27, 2023, which claims priority from and benefit of U.S. Provisional Patent Application Ser. No. 63/478,101, filed on Dec. 30, 2022, each of which is hereby incorporated by reference herein in its entirety.

TECHNICAL FIELD

The present disclosure relates generally to superconducting and spin quantum bit (qubit) controllers. More particularly, aspects of this disclosure relate to amplitude and/or phase controlled shaped radio frequency (RF) waveform generators for superconducting and spin qubits.

BACKGROUND

Quantum computing involves the use of qubits to represent information, where the state of each qubit can be described as the linear superposition of its two basis states, e.g., $\alpha|0\rangle+\beta|1\rangle$. Multiple qubits can further be entangled, thereby leading to a quantum state in the tensor product space generated by the individual qubit spaces. For example, the state of two qubits can be represented as $\alpha|00\rangle+\beta|01\rangle+\gamma|10\rangle+\delta|11\rangle$. It follows that the state of N qubits is actually a superposition of all 2N eigenstates. The power of quantum computing lies in its ability to manipulate all 2N of these coefficients at once, as contrasted with classical parallel computing where the number of values that can be manipulated at once only grows linearly with the number of registers in the computer. This aspect of quantum computing makes it potentially much more powerful than classical computing for certain types of problems.

While quantum computing is believed to hold great promise, implementation has been somewhat limited. For instance, current state-of-the-art superconducting quantum computers are only able to implement a maximum of 127 qubits. A major factor contributing to this processing restriction is the limited cooling power available in superconducting quantum computers. Superconducting properties are encouraged at lower temperatures, and therefore portions of superconducting quantum computers are kept in cryogenic environments with internal temperatures of a few Kelvin. These extremely low temperatures limit the amount of power that may be used without impacting the cryogenic environment.

Currently, even the most advanced quantum computers having about 127 qubits are able to function under this power limitation, but the achievable size of quantum computers (or the number of qubits included therein) is rapidly changing. For instance, it is believed that roughly 1 million physical qubits are needed to run practical quantum algorithms. At this scale, the controller electronics for each qubit cannot consume more than a few milliwatts without compromising operational efficiency and/or functionality. However, this limitation of a few milliwatts is less than one-tenth the amount of power the most advanced superconducting controllers developed today consume. Accordingly, the advancement of quantum computers has been significantly limited.

SUMMARY

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Implementations of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

In one example, a quantum computing device, includes a plurality of quantum bits, and waveform generators. Each waveform generator is coupled to one or more of the quantum bits. Each of the waveform generators further include: a current-pulse generator, an adjustable negative resistor, an adjustable capacitor, and a transformer. Moreover, each waveform generator is configured to program the respective quantum bit that is coupled thereto, using about 2 milliwatts of power.

In another example, a method of operating a quantum computer includes (a) initiating a quantum operation, (b) causing one or more waveforms to be formed via a waveform generator, (c) applying the one or more waveforms to a plurality of quantum bits, (d) receiving states of the quantum operation performed using the plurality of quantum bits, and (e) performing further processing via the received states of the quantum operation.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative implementations together with reference to the accompanying drawings. These drawings depict only representative implementations, and are therefore not to be considered as limitations on the scope of the various implementations or claims.

DETAILED DESCRIPTION

Figure 1:
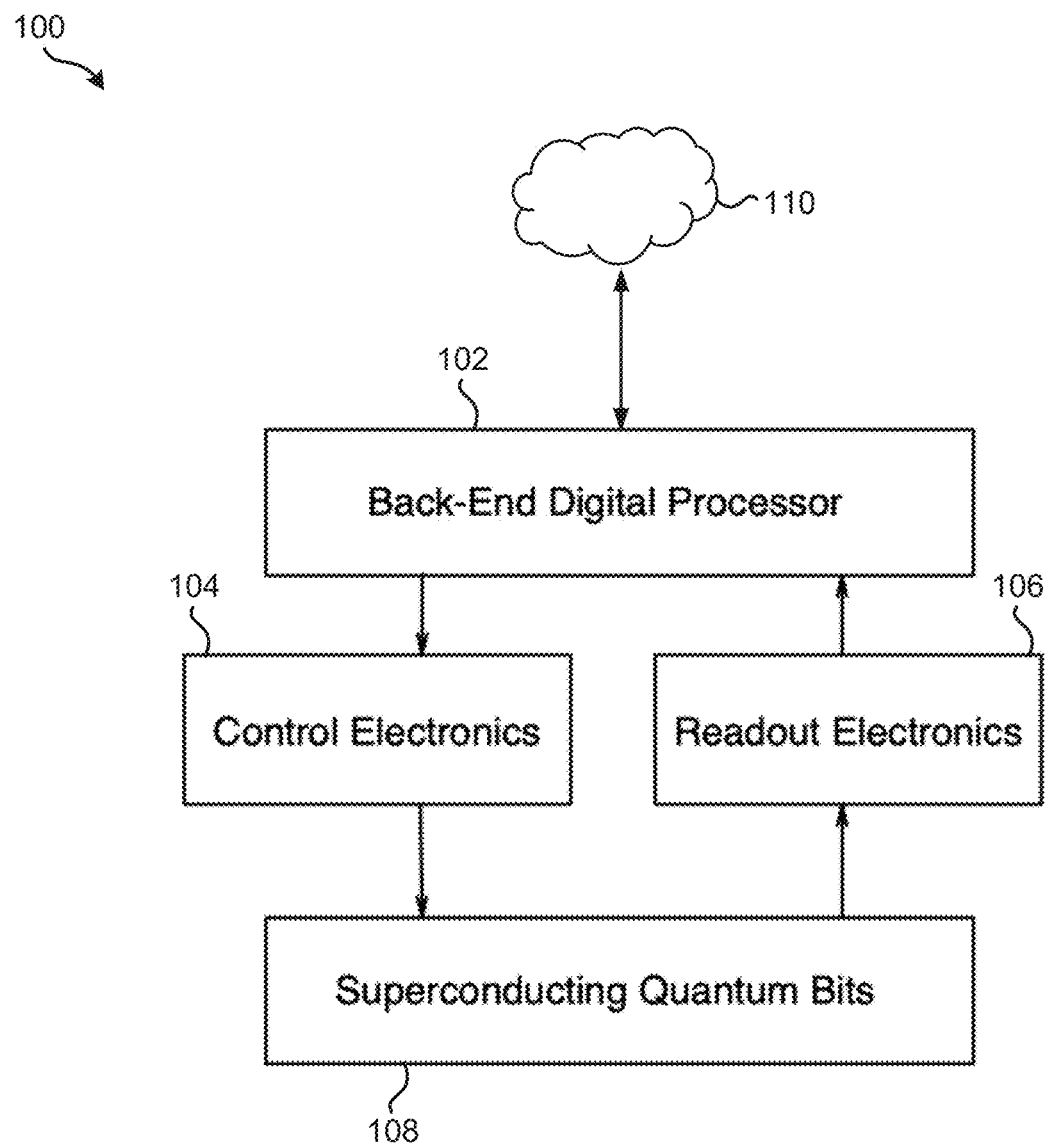
FIG. 1 is a simplified block diagram of a superconducting quantum computer, according to certain aspects of the present disclosure.

According to one implementation, a quantum computing device, includes a plurality of quantum bits, and waveform generators. Each waveform generator is coupled to one or more of the quantum bits. Each of the waveform generators further includes: a current-pulse generator, an adjustable negative resistor, an adjustable capacitor, and a transformer. Moreover, each waveform generator is configured to program the respective quantum bits that are coupled thereto, using less than a few milliwatts of power.

Various implementations are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various implementations disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical", "horizontal", "parallel", and "perpendicular" are intended to additionally include "within 3-5% of" a vertical, horizontal, parallel, or perpendicular orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

As noted above, quantum computing involves the use of qubits to represent information, where the state of each qubit can be described as the linear superposition of its two basis states, e.g., $\alpha|0\rangle+\beta|1\rangle$). Multiple qubits can further be entangled, thereby leading to a quantum state in the tensor product space generated by the individual qubit spaces. It follows that the state of N qubits is actually a superposition of all 2N eigenstates. Quantum computing excels by being able to manipulate all 2N of these coefficients at once, in contrast to traditional computing for which the number of values that can be manipulated at once grows linearly with the number of registers.

In order to maintain control over the physical structures that implement these superimposed states, the quantum system is kept at cryogenic temperatures to prevent thermal noise from disrupting the system. Unlike bits in classical computers, qubits are subject to temporal degradations and inaccuracies that cause eventual loss of information and increased error rates. For example, thermal, RF, and other types of noise produced by control electronics used to interact with the qubits may compromise the quantum computer as a whole.

Thus, while quantum computing is believed to hold great promise, computational capacity has been somewhat limited. As noted above, current state-of-the-art superconducting quantum computers are only able to implement a maximum of about 127 qubits. A major factor contributing to this processing restriction is the limited power available in superconducting quantum computers to avoid negatively impacting the system by adding noise, as described above. Superconducting properties are encouraged at lower temperatures, and therefore portions of superconducting quantum computers are kept in cryogenic environments with internal temperatures of a few Kelvin. These extremely low temperatures limit the amount of power that may be used without impacting the cryogenic environment.

Currently, even the most advanced quantum computers having about 127 qubits are able to function under this power limitation, but the achievable size of quantum computers (or the number of qubits included therein) is rapidly increasing. For instance, it is believed that roughly 1 million physical qubits are needed to run practical quantum algorithms. At this scale, the controller electronics for each qubit cannot consume more than a few milliwatts without compromising operational efficiency and/or functionality. However, this limitation of a few milliwatts is less than one-tenth the amount of power the most advanced superconducting controllers developed today consume. Accordingly, the computational capacity of quantum computers has been significantly limited.

In sharp contrast to these conventional shortcomings, various ones of the implementations included herein are able to significantly reduce the amount of power used to control the state of qubits. For example, waveform generators as described herein may be able to program (e.g., set or at least influence the state of) a quantum bit using less than a few milliwatts of power (e.g., less than about 2 milliwatts). In some implementations, the power used to program a quantum bit can be less (e.g., about 1 milliwatt of power, less than 1 milliwatt of power, etc.). These implementations are desirably able to minimize operating errors while also maintaining a low enough power consumption to operate at cryogenic temperatures without producing an undesirably large amount of noise. The improvements in power consumption efficiency achieved by the implementations herein allow for scaling the number of qubits in a quantum computing system to achieve complex functionality and provide significant value, e.g., as will be described in further detail below.

Looking to FIG. 1, a simplified block diagram of a superconducting quantum computer 100 is illustrated in accordance with one implementation. As an option, the present quantum computer 100 may be combined with features from any other implementation included herein, such as those described with reference to the other FIGS. However, such quantum computer 100 and others presented herein may be used in various applications and/or in permutations which may or may not be specifically described in the illustrative implementations included herein. Further, the quantum computer 100 presented herein may be used in any desired environment. Thus, FIG. 1 (and the other FIGS.) may be deemed to include any possible permutation.

As shown, the superconducting quantum computer 100 includes a digital processor 102 that is electrically coupled to a control module 104 (i.e., control electronics) and a readout module 106 (i.e., readout electronics). The control module 104 is configured to influence (e.g., program) qubits included in the quantum compute module 108 (e.g., superconducting quantum bits). Accordingly, the control module 104 preferably includes physical electronic components that are able to control the quantum compute module 108. In other words, the control module 104 may be a superconducting quantum bit controller if the quantum computer module 108 includes superconducting quantum bits.

The process of controlling qubits in the quantum compute module 108 may vary depending on the particular approach. For instance, in some approaches qubits in the quantum compute module 108 are superconducting qubits. It follows that in such approaches, the control module 104 may control the superconducting qubits by applying one or more waveforms to one or more of the qubits. In one example, which is in no way intended to limit the description, the control module 104 may be able to control superconducting qubits using a selectively shaped radiofrequency (RF) waveform (e.g., see waveform generators 202, 252 of FIGS. 2A-2B below, respectively).

Referring still to FIG. 1, the readout module 106 includes physical electronic components that are able to deduce a computational answer by evaluating properties of the qubits in the quantum compute module 108. The process of determining characteristics of the qubits may vary depending on the particular approach. For instance, in some approaches, qubits in the quantum compute module 108 are superconducting qubits. It follows that in such approaches, the readout module 106 may receive information from the quantum compute module 108 by detecting the quantum states of one or more of the qubits. In one example, which is in no way intended to limit the description, the readout module 106 may detect the quantum states of the qubits and/or combinations of the qubits. For instance, quantum gates for superconducting qubits may be organized and applied to the specific qubits in a specific order, e.g., as outlined in a quantum circuit model, or any other model. A quantum gate acts on one or more qubits to evolve the quantum state of the qubits based on the specific gate function. Quantum gates can be single-qubit gates or multi-qubit gates.

The superconducting quantum computer 100 uses electronics to control superconducting quantum bits in the quantum compute module 108, as well as to read out the states of the quantum bits. The digital processor 102 may be used to interact with the control module 104 and the readout module 106 in order to achieve this functionality. Thus, depending on the particular approach, the digital processor 102 may be configured to send one or more instructions, requests, units of information (e.g., data packets), etc., to the control module 104. The digital processor 102 may also be configured to receive one or more types of information (e.g., probability distributions, definitive answers, etc.) from the readout module 106.

The digital processor 102 is also shown as being connected to a network 110. The type of network 110 connected to the digital processor 102 may vary depending on the implementation. For instance, in some approaches the digital processor 102 is connected to a local area network (LAN) which provides access to the improved computational abilities of the quantum compute module 108 to other devices also connected to the LAN. In other approaches, the network 110 may be a wide area network (WAN), e.g., such as the Internet. However, an illustrative list of other network types which network 110 may implement includes, but is not limited to, a public switched telephone network (PSTN), a storage area network (SAN), an internal telephone network, etc. As noted above, this extends the significant computational improvements achieved by the various implementations of quantum computers herein, to any location (e.g., device) connected to the network 110 also.

It follows that in some implementations, the digital processor 102 serves as an intermediary layer between the quantum characteristics of the compute module 108, and a remainder of an overarching system. In other words, the digital processor 102 may function as a digital interface between the quantum processors and the network 110. The control module 104 and the readout module 106 may thereby serve as quantum-analog-digital converters. Accordingly, information (e.g., data, commands, metadata, etc.) in analog form may be sent between the quantum compute module 108 and the modules 104, 106, while digital information is sent between the digital processor 102 and modules 104, 106. It follows that some components in the superconducting quantum computer 100 are able to convert information between different forms, perform various operations on the information in the different forms, send and/or store the information in different locations, etc. For example, in some approaches, the control module 104 and/or readout module 106 may operate together with the digital processor 102 to achieve a system that is able to process quantum as well as digital and/or analog information, e.g., as would be appreciated by one skilled in the art after reading the present description. The processor 102 may serve as a back-end digital processor that performs quantum algorithms for a wide range of applications, e.g., pharmaceutical development, scientific discovery, etc.

Figure 2A:
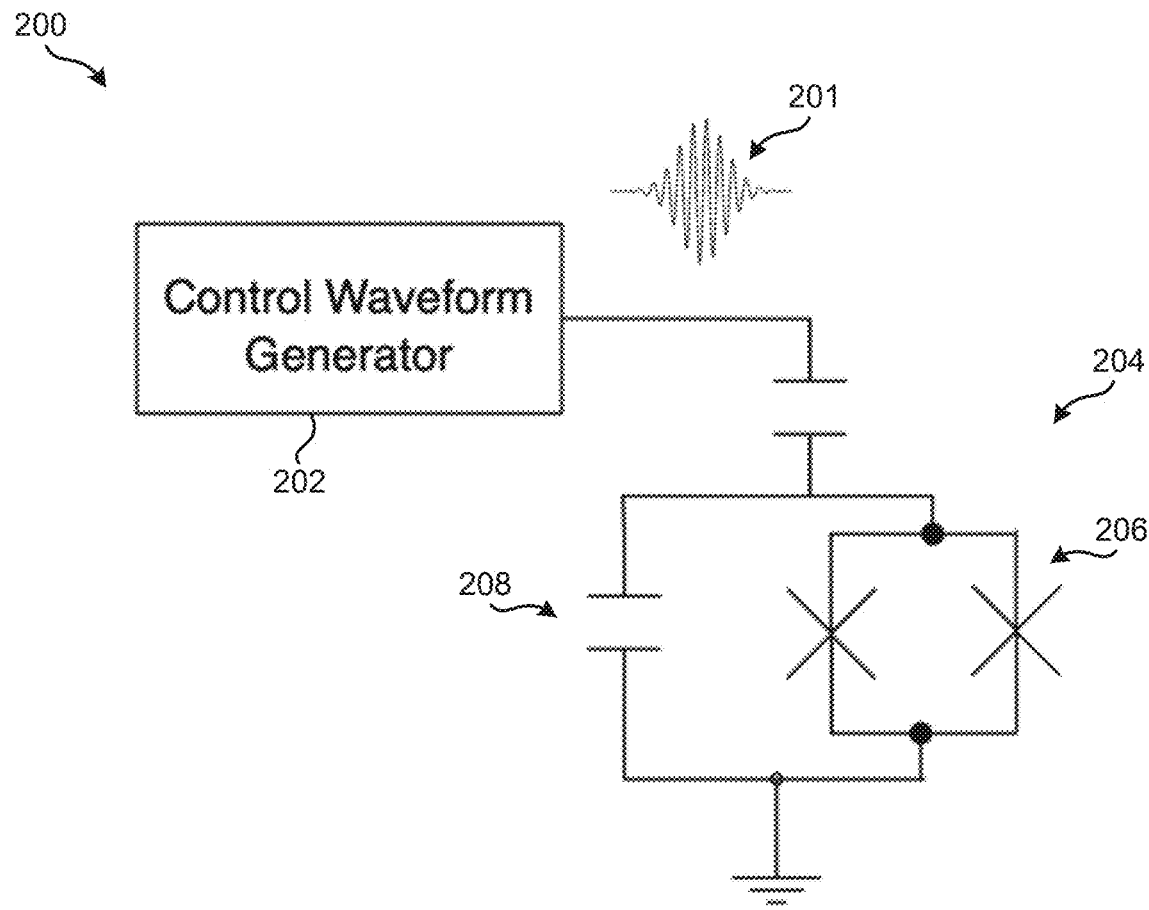
FIG. 2A is a representational view of a control module, according to certain aspects of the present disclosure.

The specific configuration of the control module 104 may vary depending on the implementation. For instance, the type of qubit(s) used in the quantum compute module 108 may impact the physical components and/or processes implemented therein. Types of qubits include superconducting qubits, spin qubits, etc. Referring now to FIG. 2A, a representational diagram of a control module 200 for a superconducting qubit is illustrated in accordance with one implementation. As an option, the present control module 200 may be combined with features from any other implementation included herein, such as those described with reference to the other FIGS., e.g., such as FIG. 1. However, such control module 200 and others presented herein may be used in various applications and/or in permutations which may or may not be specifically described in the illustrative implementations included herein. Further, the control module 200 presented herein may be used in any desired environment. Thus FIG. 2A (and the other FIGS.) may be deemed to include any possible permutation.

As shown, the control module 200 includes a waveform generator 202 that is able to selectively create (or "control") a waveform of a desired type. The waveform generator 202 can be implemented using microelectronics to provide voltages with specific waveforms (e.g., see 256 in FIG. 2B) to drive quantum gates (e.g., see 254 in FIG. 2B). Accordingly, the waveform generator 202 is preferably able to generate waveforms having any desired amount of complexity (number of waveform components), shapes, frequencies, etc. In some approaches, the waveform generator 202 may simply generate waveforms based on information (e.g., commands, signals, data, instructions, etc.) received directly from a digital processor (e.g., see digital processor module 102 of FIG. 1). In other approaches, the waveform generator 202 may generate waveforms based on information received from a compute module (e.g., see quantum compute module 108 of FIG. 1). In other approaches, waveforms may be generated by the waveform generator 202 based on real-time feedback, a type of qubit being programmed, user input, a running application, etc. In some implementations, the real-time feedback may be received from a compute module (e.g., see quantum compute module 108 of FIG. 1).

As shown, the waveform generator 202 is connected to a superconducting qubit 204. According to the present implementation, the qubit 204 includes a Josephson junction loop 206 and a capacitor 208 that represents the intrinsic capacitance. In combination, the Josephson junction loop 206 and capacitor 208 can function as an equivalent to a frequency-tunable nonlinear inductor-capacitor resonator, e.g., as would be appreciated by one skilled in the art after reading the present description. As previously mentioned, the state of a qubit (e.g., the superconducting qubit 204) may be controlled by applying a shaped RF waveform at the resonance frequency of the qubit 204. As a result, the tunable amplitude and phase of the RF waveform (e.g., see 201) are used to control (e.g., program) the instantaneous state of the qubit 204. The shape of the RF waveform can vary depending on the implementation and may include Gaussian, Cosine, rectangle, triangle, etc. However, it is preferred in some implementations that Gaussian shaped RF waveforms are used to program qubits in a quantum computer, as Gaussian shaped RF waveforms result in considerably lower noise and crosstalk.

Looking to qubit 204, the physical components used to form the structure may vary depending on the implementation. For instance, it may be desirable that the components in the qubit 204 have a higher sensitivity than components in a remainder of the system. This may help improve the stability of the resulting qubit. The types of components used to form a qubit may also vary.

Figure 2B:
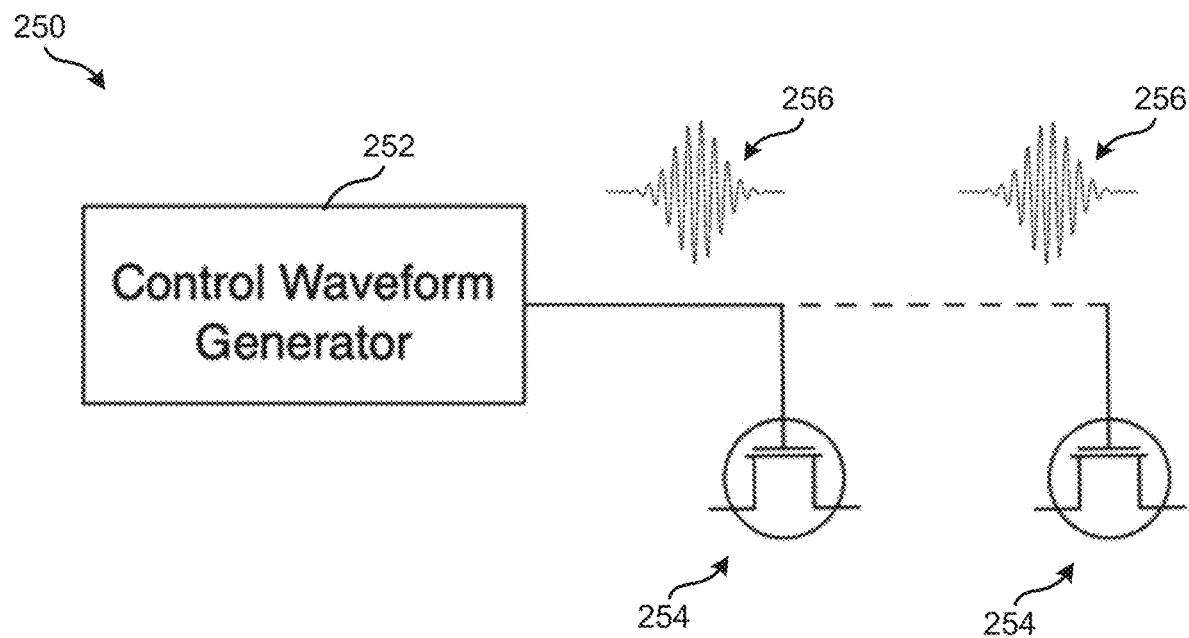
FIG. 2B is a representational view of another control module, according to certain aspects of the present disclosure.

For instance, FIG. 2B includes a representational diagram of a control module 250 for a qubit accordance with one implementation. As an option, the present control module 250 may be combined with features from any other implementation included herein, such as those described with reference to the other FIGS., e.g., such as FIG. 1. However, such control module 250 and others presented herein may be used in various applications and/or in permutations which may or may not be specifically described in the illustrative implementations included herein. Further, the control module 250 presented herein may be used in any desired environment. Thus FIG. 2B (and the other FIGS.) may be deemed to include any possible permutation.

As shown, the control module 250 includes a waveform generator 252 that is able to selectively create (or "control") a waveform of a desired type. Accordingly, the waveform generator 252 is preferably able to generate waveforms having any desired amount of complexity (number of waveform components, amplitude of each waveform component, phase of each waveform component), shapes, frequencies, etc. In some approaches, the waveform generator 252 may simply generate waveforms based on information (e.g., commands, signals, data, instructions, etc.) received directly from a digital processor (e.g., see digital processor module 102 of FIG. 1). In an example, an instruction is a single prescribed action that is part of the instruction set architecture of the digital processor; a command is a complex instruction, for example, a computer program or computer function including multiple instructions to be executed in a specific sequence; data can include parameters used in the instructions and/or commands or can include qubit data processed by the digital processor; and a signal can include commands for generating a specific analog waveform.

In other approaches, the waveform generator 252 may generate waveforms based on information received from a compute module (e.g., see quantum compute module 108 of FIG. 1). For example, data read from the superconducting qubits in the quantum compute module 108 can be used to generate waveforms for the next quantum operations to be performed by the quantum computer 100. In other approaches, waveforms may be generated by the waveform generator 252 based on real-time feedback, a type of qubit being programmed, user input, a running application, etc. In some implementations, the real-time feedback may be received from a compute module (e.g., see quantum compute module 108 of FIG. 1). The real-time feedback can be quantum states of the qubits. In some implementations, a type of qubit being programmed includes gate-based superconducting qubits or spin qubits. In some implementations, user inputs can include selecting specific applications to run, selecting specific parameters for such an application, etc.

As shown, the waveform generator 252 is connected to the gates of one or more spin qubits 254. In some implementations, each spin qubit 254 has a single electron spin under the gate of the corresponding silicon transistor-like device. The gate of each spin qubit is controlled by a respective shaped RF waveform 256 at the corresponding qubit's resonance frequency with tunable amplitude and phase. This RF waveform 256 may be formed by the waveform generator 252 and delivered to each of the respective spin qubits 254. However, it should be noted that the two gates correspond to two different RF waveforms at two slightly different resonant frequencies of the two spin qubits 254. The amplitude and phase of the RF waveforms may also differ slightly. The two RF waveforms are generated at a different time to form a resulting time-multiplexed waveform, e.g., as would be understood by one skilled in the art after reading the present description.

An exemplary waveform 201 is also shown as being sent from the waveform generator 202 to the qubit 204, and similarly waveform 256 is also shown as being sent from the waveform generator 252 to the qubits 254. These exemplary waveforms 201 and/or 256 may include a complex waveform that may be used to influence the state (e.g., program) of the respective qubit 204 and 254. As previously mentioned, a different waveform generator (e.g., 202 of FIG. 2A and/or 252 of FIG. 2B) may be connected to each of the qubits in a given quantum computing environment. Thus, the configurations illustrated in FIGS. 2A-2B may each correspond to a single qubit in a given quantum computer, e.g., as would be appreciated by one skilled in the art after reading the present description. By reducing the amount of power consumption associated with influencing a qubit, e.g., power of the waveform generators 202, 252 as seen in FIGS.

2A-2B, implementations included herein are able to reduce overall power consumption by a factor of at least 10 compared to conventional products.

Figure 3:
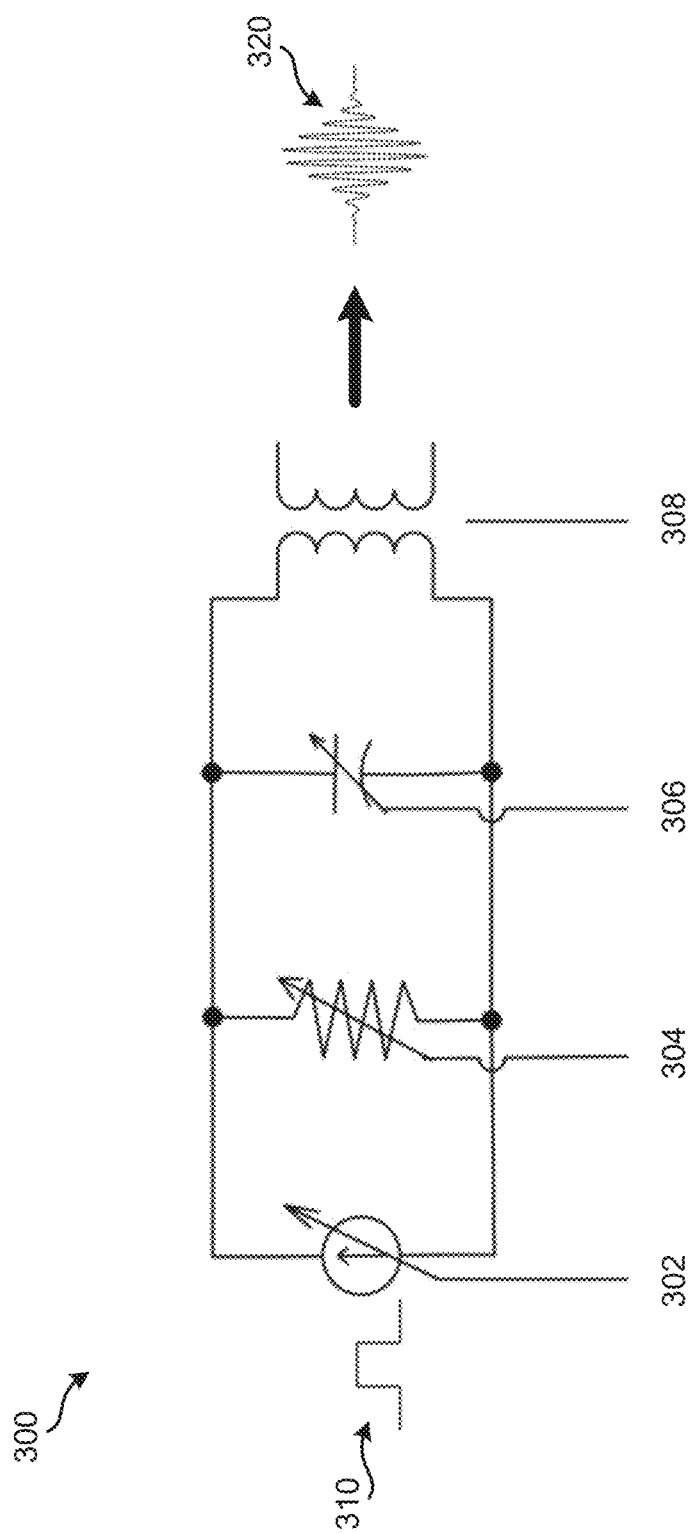
FIG. 3 is a simplified circuit diagram of an amplitude and phase controlled RF waveform generator for qubits, according to certain aspects of the present disclosure.

These improvements to operating efficiency are achieved at least in part as a result of implementing the combination and arrangements of components included in the approaches herein. For instance, referring to FIG. 3, a waveform generator 300 that is able to control the state of a qubit using much lower (e.g., about 10 times lower) power than has been conventionally achievable, is illustrated in accordance with one implementation. As an option, the present waveform generator 300 may be combined with features from any other implementation included herein, such as those described with reference to the other FIGS., e.g., such as FIGS. 1-2. For example, any of the implementations described above with respect to waveform generators 202, 252 of FIGS. 2A-2B may be incorporated in waveform generator 300.

However, such waveform generator 300 and others presented herein may be used in various applications and/or in permutations which may or may not be specifically described in the illustrative implementations included herein. Further, the waveform generator 300 presented herein may be used in any desired environment. Thus FIG. 3 (and the other FIGS.) may be deemed to include any possible permutation.

As shown, the waveform generator 300 includes a time-adjustable, current-pulse generator 302. The current-pulse generator 302 may be used to generate a current pulse 310 to control the phase and/or other details of the shaped RF waveform that is ultimately produced by the waveform generator 300.

Moreover, the waveform generator 300 includes an adjustable negative resistance 304. This adjustable negative resistance 304 may be used to control the amplitude and envelope shape of the shaped RF waveform that is ultimately produced by the waveform generator 300. In some approaches, characteristics of the negative resistance are programmed in a sequence based on the expected amplitude and envelope shape of the RF waveform. It follows that the specific properties of the negative resistance 304 may vary depending on the particular implementation.

An adjustable capacitor 306 is included in the waveform generator 300. In some approaches, a primary inductor of a transformer 308 and the capacitor 306 form a resonator. The adjustable capacitor 306 is thereby preferably configured to tune the resonant frequency of the resonator. The resonant frequency of the shaped RF waveform ultimately produced by the waveform generator 300 is coupled to a secondary inductor of the transformer 308 in some approaches. In some implementations, the adjustable capacitor 306 includes an array of capacitors. Moreover, the array may include one or more adjustable capacitors and/or a dithering of capacitors.

Furthermore, the transformer 308 is used to deliver the shaped RF waveform out to a superconducting or spin qubit that is connected to the waveform generator 300. As noted above, each qubit may be coupled to a different waveform generator. Accordingly, the transformer 308 in FIG. 3 may be connected to a qubit (e.g., a superconducting qubit).

It follows that the various components included in the waveform generator 300 operate together to produce a selectively tunable waveform that can be used to influence the status of at least 1 qubit. Moreover, this is achieved while consuming only a fraction of the power used in conventional products. For instance, some of the implementations included herein are able to reduce power consumed programming each qubit by a factor of 10. As a result, efficiency of quantum components used in quantum computing is significantly improved. The power savings of the waveform generator 300 stems from building the waveform generator 300 using passive devices (e.g., the adjustable capacitor 306, and the transformer 308) which do not consume power. Furthermore, the waveform generator 300 is a simple, unique circuit block that combines the functions of RF waveform generation and modulation while reducing the total number of power-consuming active components.

Figure 4A:
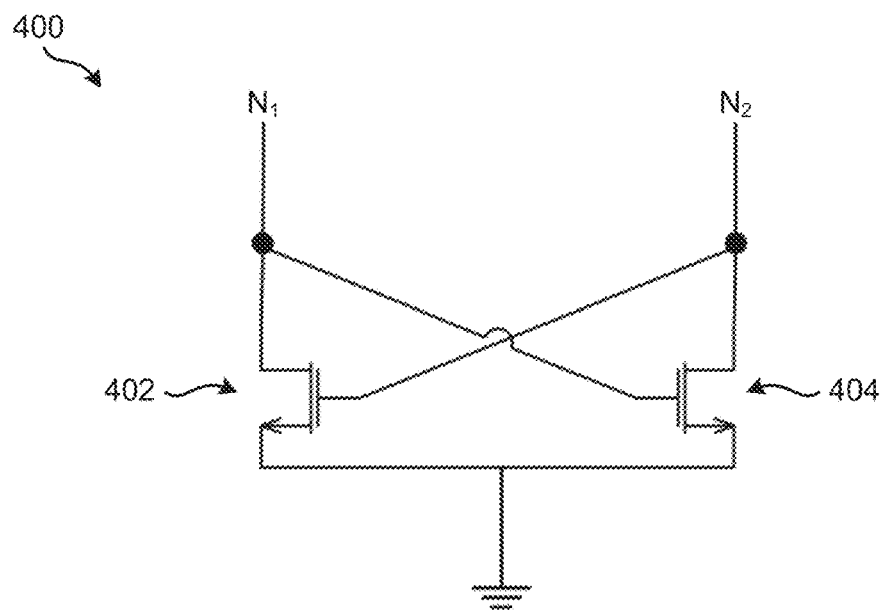
FIG. 4A is a representational view of a negative resistance component, according to certain aspects of the present disclosure.

FIG. 4A illustrates a negative resistance component 400 in accordance with one implementation. As an option, the present negative resistor 400 may be combined with features from any other implementation included herein, such as those described with reference to the other FIGS., e.g., such as FIGS. 1-3. For example, the present negative resistor 400 may be implemented as adjustable negative resistor 304 of FIG. 3.

However, such negative resistor 400 and others presented herein may be used in various applications and/or in permutations which may or may not be specifically described in the illustrative implementations included herein. Further, the negative resistor 400 presented herein may be used in any desired environment. Thus FIG. 4A (and the other FIGS.) may be deemed to include any possible permutation.

As shown, the negative resistor 400 includes a cross-coupled pair of transistors 402, 404. This cross-coupled pair of transistors 402, 404 is able to generate negative resistance between the two open nodes "N1" and "N2." In other words, the configuration of the negative resistor 400 causes it to experience a resistance phenomenon in which the voltage drop across the open nodes "N1" and "N2" decreases as the supply current increases. In some implementations, the transistors 402, 404 may be n-type transistors, while in other implementations the transistors 402, 404 may be p-type transistors. In other implementations, the transistors used in a quantum computer may differ in other ways. Sizing of the transistors 402, 404 affects the realized negative resistance, thus design considerations are taken into account to adjust the negative resistance according to the waveform to be generated. The realized negative resistance can be a function of the transconductance of the transistors 402, 404 which is a function of transistor sizing. The biasing of the transistors 402, 404 can also affect the realized negative resistance by affecting the transconductance of the transistors 402, 404. Thus, current can be applied to the source terminals of the cross-coupled pairs to adjust the negative resistance seen at the drain terminals (i.e., the open nodes "N1" and "N2"). In FIG. 4A, a tail current source can be inserted between the ground terminal and the source terminal of the n-type transistors, and adjusting current of the current source can adjust the negative resistance seen at the drain terminals.

Figure 4B:
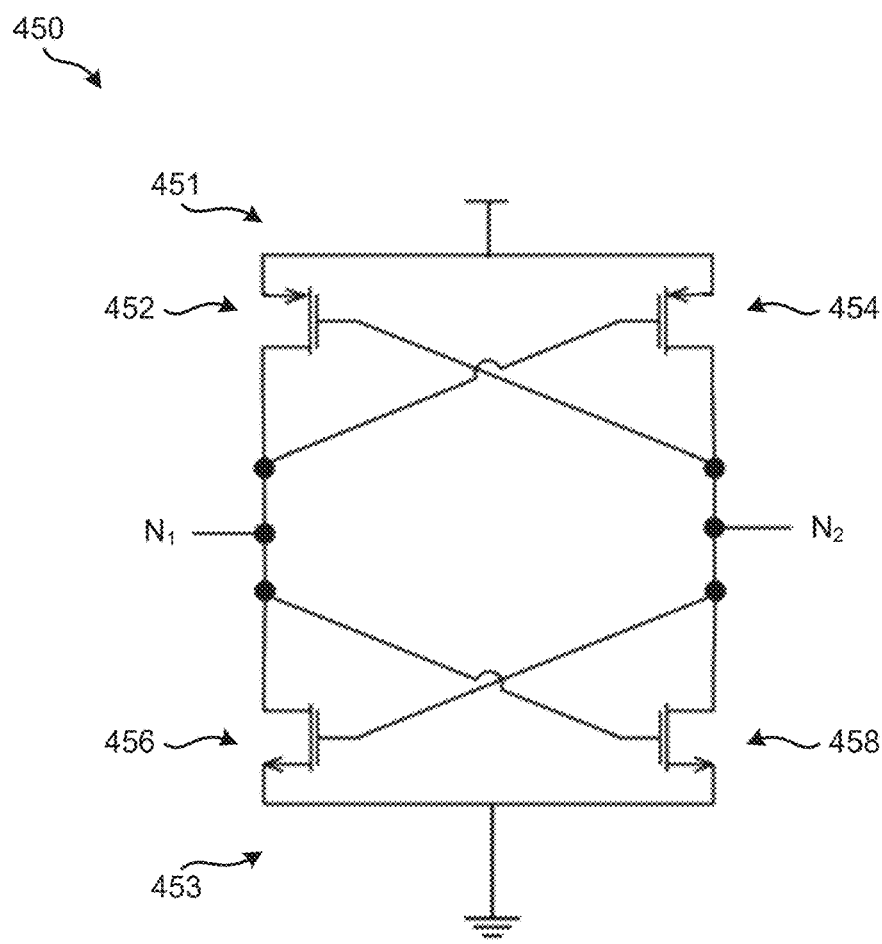
FIG. 4B is another representational view of a negative resistance component, according to certain aspects of the present disclosure.

Looking now to FIG. 4B, a negative resistance component 450 is illustrated in accordance with another implementation. As an option, the present negative resistor 450 may be combined with features from any other implementation included herein, such as those described with reference to the other FIGS., e.g., such as FIGS. 1-3. For example, the present negative resistor 450 may be implemented as adjustable negative resistor 304 of FIG. 3.

However, such negative resistor 450 and others presented herein may be used in various applications and/or in permutations which may or may not be specifically described in the illustrative implementations included herein. Further, the negative resistor 450 presented herein may be used in any desired environment. Thus FIG. 4B (and the other FIGS.) may be deemed to include any possible permutation.

As shown, the negative resistor 450 includes more than one cross-coupled pair of transistors. Specifically, the present implementation includes a first pair 451 of cross-coupled transistors 452, 454, and a second pair 453 of cross-coupled transistors 456, 458. While the first and second pairs 451, 453 appear to be complementary mirror copies of each other, different transistor pairs may be configured the same or differently as desired with respect to each other to realize a negative resistance between the open nodes "N1" and "N2". In other words, the first and second pairs 451, 453 may be implemented to realize identical, different, or similar values of negative resistances, etc.

The first pair 451 of cross-coupled transistors 452, 454 are configured to work in combination with the second pair 453 of cross-coupled transistors 456, 458. For instance, the first and second pairs 451, 453 may cooperate to generate a negative resistance between the two open nodes "N1" and "N2." In other words, the configuration of the negative resistors 451, 453 causes the resulting configuration to experience a resistance phenomenon in which the voltage drop across the open nodes "N1" and "N2" decreases as the supply current increases. In some implementations, the transistors in each pair 451, 453 may be a same type, while in other implementations the transistors in each pair are similar or different types of transistors. Transistors may similarly be the same, similar, or different across the different pairs 451, 453. Similar to FIG. 4A, sizing and biasing of the transistors in each pair 451, 453 can affect the negative resistance seen at the drain terminals (i.e., the open nodes "N1" and "N2"). A top tail current can be placed between the p-type transistors 452, 454 and the positive reference to bias the source of these transistors for adjusting the negative resistance seen at the drain terminals. Similar to FIG. 4A, a bottom tail current can be inserted between the n-type transistors 456, 458 and the ground terminal to bias the source of these transistors for adjusting the negative resistance seen at the drain terminals.

Figure 5:
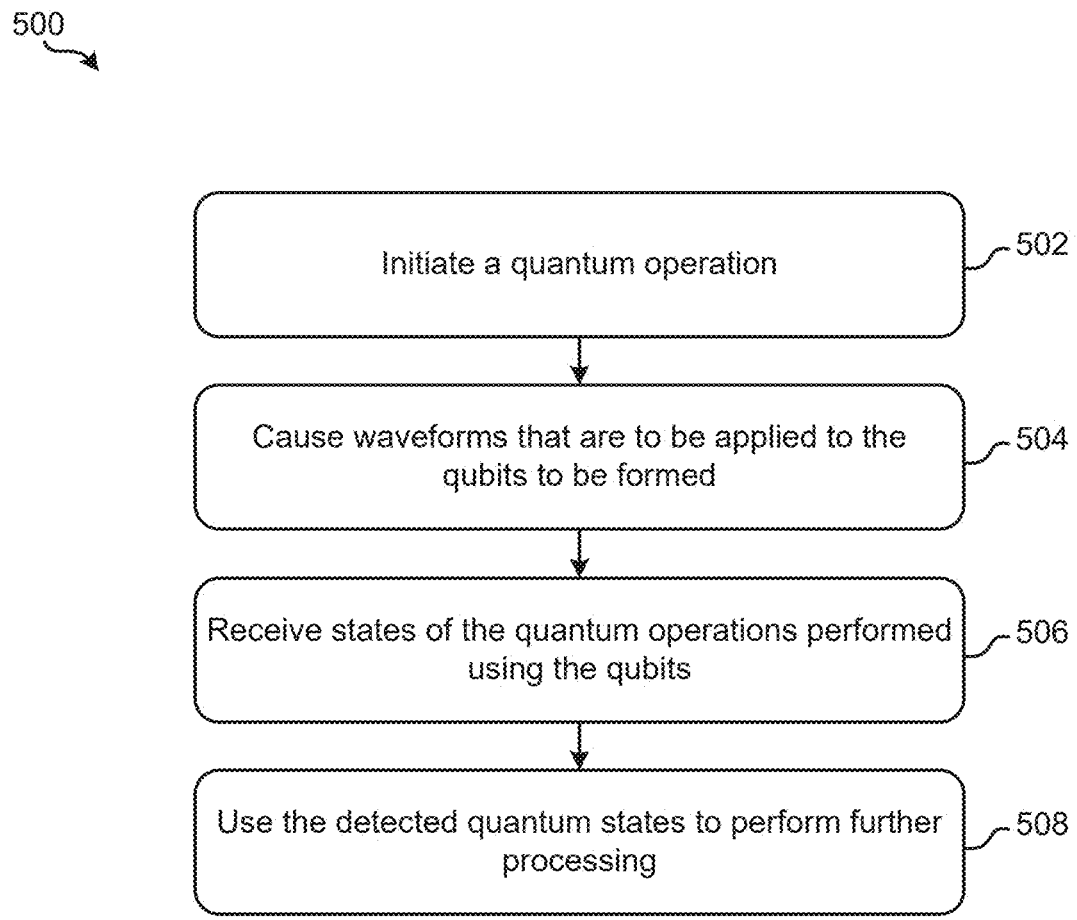
FIG. 5 is a flowchart of a method, according to certain aspects of the present disclosure.

Looking now to FIG. 5, a method 500 of operating a quantum computer is presented in accordance with one approach, which is in no way intended to be limiting. a flowchart of a computer-implemented method 500 is shown according to one implementation. The method 500 may be performed in accordance with the present invention in any of the environments depicted in FIGS. 1-4B, among others, in various implementations. Of course, more or less operations than those specifically described in FIG. 5 may be included in method 500, as would be understood by one of skill in the art upon reading the present descriptions.

Each of the steps of the method 500 may be performed by any suitable component of the operating environment using known techniques and/or techniques that would become readily apparent to one skilled in the art upon reading the present disclosure. For example, one or more of the steps in method 500 may be performed by a digital processor (e.g., see digital processor 102 of FIG. 1 that is electrically coupled to control module 104 and readout module 106). In various other implementations, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, operation 502 of method 500 includes initiating a quantum operation that is to be performed. The quantum operation may be received from a user, a running application, another quantum computer, as a result of a machine learning model trained using one or more sets of training data, etc. Moreover, the quantum operation may involve using qubits as described herein. Accordingly, in some implementations the quantum operation involves using superconducting or spin qubits. Examples of quantum operations include bit-flip, phase-flip, bit-phase flip, state depolarization, amplitude damping, and phase damping.

Moreover, operation 504 includes generating waveforms that are to be applied to the qubits. In other words, operation 504 includes developing one or more waveforms to apply to one or more qubits to preferably implement at least a portion of the received quantum operation. In some instances, operation 504 may only include sending one or more instructions to initiate generation of the waveforms. In other words, operation 504 may actually be performed by a central controller that sends one or more instructions to a control module (e.g., see 104 of FIG. 1) that includes a waveform generator that actually generates the waveforms.

Moving to operation 506, the quantum states of the quantum operations performed using the qubits is detected. In other words, operation 506 involves determining an outcome of applying the RF waveform(s) to the qubit(s). In some implementations, the quantum states are determined using information received from the physical readout electronics in the system (e.g., readout electronics in the readout module 106 of FIG. 1). The readout electronics can determine quantum states by detecting change of amplitude or phase of the quantum resonators. The detected quantum states are provided to the back-end digital processor to provide results of the performed quantum computing. Accordingly, operation 508 further includes using the detected quantum states to perform further processing. For example, the results of the quantum states may be converted into digital and/or analog form and used in further digital and/or analog processing. This additional processing may involve using one or more machine learning models, forming (e.g., training) one or more machine learning models, implementing neural networks, statistical recognition, etc. For example, quantum algorithms can run on the quantum computer 100 through control and detecting the quantum states of the qubits, based on quantum Fourier transformation, amplitude amplification, or superposition. Moreover, the detected quantum states and/or results of the additional processing may further be sent to one or more locations. In some instances, these one or more locations are remote relative to a quantum computing environment used.

Again, various ones of the implementations included herein are able to significantly reduce the amount of power used to control the state of qubits. These implementations are desirably able to minimize operating errors while also maintaining low enough power consumption to operate at cryogenic temperatures without producing an undesirably large amount of noise. Readout complexity, physical footprints, errors, and price of the resulting products is also significantly reduced as a result of implementing various ones of the approaches herein.

The improvements in power consumption efficiency achieved by the implementations herein allow for scaling the number of qubits in a quantum computing system to achieve complex functionality and provide significant value. Some of the implementations achieve this by generating RF waveforms having controlled amplitude and/or phase shapes to control the superconducting qubits at a power lower than a few milliwatts per qubit. For example, waveform generators as described herein may be able to program (e.g., set or at least influence the state of) a quantum bit using about 2 milliwatts of power, but could be less (e.g., about 1 milliwatt of power) in some implementations. As a result, the implementations herein are able to operate much more efficiently than ever conventionally achievable.

As described earlier, portions of superconducting quantum computers are kept at extremely low temperatures (i.e., cryogenic temperatures) to reduce thermal noise that may introduce loss of information, therefore, the amount of power that may be used in these environments should not considerably increase the temperature. Circuits and methods that can minimize the amount of power used to program qubits can drastically improve energy requirements of superconducting quantum computers (i.e., both energy needed for maintaining the cryogenic environment and energy needed to program and read the qubits). By improving energy requirements, for a same energy budget, a larger number of qubits can be provided in the quantum computer.

Conventional waveform generators include a single-frequency RF signal generator with fixed amplitude and a waveform modulator that mixes the RF signal with a low-frequency amplitude shaping signal. At least three circuit blocks are needed to implement conventional waveform generators—an RF signal generator, a low-frequency amplitude shape generator, and a mixer. In contrast, some implementations of the present disclosure combine the functions of the three circuit blocks in a conventional waveform generator into one simple circuit block, therefore, reducing the circuit complexity, power, noise, footprint, and thus, the cost of manufacturing the waveform generator (e.g., the waveform generator 300) used in quantum computers (e.g., the quantum computer 100).

It should also be noted that the various implementations herein may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It follows that although various aspects of the implementations herein have been illustrated as including specific designs, orientations, numbers of components, etc., this is in no way intended to limit the invention. Rather, the implementations herein are presented for exemplary purposes only and may vary in design, orientation, number of components, etc., depending on the desired approach. It should also be noted that use of the terms "bottom", "lower", "top", "upper", etc., are in no way intended to be limiting. Any frames of reference used to describe the various implementations herein have been selected for illustrative purposes only and may be adjusted as desired.

It should also be noted that, while the disclosed implementations have been illustrated and described with respect to one or more approaches, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

It should also be understood that various implementations of the present disclosure have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A quantum computing device, comprising:
a plurality of quantum bits; and
waveform generators, each waveform generator being coupled to one or more of the quantum bits, each waveform generator having:
a current-pulse generator;
an adjustable negative resistor;
an adjustable capacitor; and
a transformer,
wherein each waveform generator is configured to program the coupled quantum bits using less than about 2 milliwatts of power.

2. The quantum computing device according to claim 1, wherein at least one of the waveform generators generates a shaped radiofrequency (RF) waveform.

3. The quantum computing device according to claim 2, wherein the shaped RF waveform includes a Gaussian waveform, a cosine waveform, a rectangular waveform, or a triangular waveform.

4. The quantum computing device according to claim 1, further comprising:
a digital processor configured to provide first information to the waveform generators to adjust waveform complexity including amplitude and phase.

5. The quantum computing device according to claim 4, wherein the first information includes commands, signals, data, or instructions.

6. The quantum computing device according to claim 1, further comprising:
a compute module configured to provide second information to the waveform generators to adjust waveform complexity including amplitude and phase.

7. The quantum computing device according to claim 6, wherein the second information includes quantum states of the coupled quantum bits.

8. The quantum computing device according to claim 1, wherein the waveform generators adjust waveform complexity based at least in part on real-time feedback, a type of qubit being programmed, user input, a running application, or any combination thereof.

9. The quantum computing device according to claim 1, wherein the adjustable negative resistor includes a first pair of cross-coupled transistors, wherein the drain terminals of the first pair of cross-coupled transistors are terminals of the adjustable negative resistor.

10. The quantum computing device according to claim 9, wherein the first pair of cross-coupled transistors are p-type transistors.

11. The quantum computing device according to claim 9, wherein the first pair of cross-coupled transistors are n-type transistors.

12. The quantum computing device according to claim 9, wherein the adjustable negative resistor further includes a second pair of cross-coupled transistors, the second pair of cross-coupled transistors being connected to the first pair of cross-coupled transistors such that the drain terminals of the first pair of cross-coupled transistors are connected to the drain terminals of the second pair of cross-coupled transistors.

13. The quantum computing device according to claim 12, wherein the second pair of cross-coupled transistors are either p-type transistors or n-type transistors.

14. The quantum computing device according to claim 1, wherein the current-pulse generator, the adjustable negative resistor, and the adjustable capacitor are arranged in a parallel circuit configuration.

15. The quantum computing device according to claim 1, wherein a primary inductor of the transformer and the adjustable capacitor form a resonator.

16. The quantum computing device according to claim 15, wherein a resonant frequency of the resonator is tuned via the adjustable capacitor.

17. The quantum computing device according to claim 1, wherein the quantum bits include superconducting qubits or spin qubits.

* * * * *